US007013218B2

(12) United States Patent
Baker, III et al.

(10) Patent No.: US 7,013,218 B2
(45) Date of Patent: Mar. 14, 2006

(54) SYSTEM AND METHOD FOR INTERPRETING REPEATED SURFACES

(75) Inventors: Robert Allison Baker, III, Houston, TX (US); Clifford Kelley, Sugar Land, TX (US); Rocky Roden, Centerville, TX (US); William Vance, Houston, TX (US)

(73) Assignee: Siesmic Micro-Technology, Inc., Houston, TX (US)

(*) Notice: Subject to any disclaimer, the term of this patent is extended or adjusted under 35 U.S.C. 154(b) by 168 days.

(21) Appl. No.: 10/621,221

(22) Filed: Jul. 16, 2003

(65) Prior Publication Data
US 2005/0027452 A1    Feb. 3, 2005

(51) Int. Cl.
*G01V 1/28*    (2006.01)

(52) U.S. Cl. ...................................................... 702/16
(58) Field of Classification Search ............ 702/14–18; 367/73; 703/9, 10, 2, 6
See application file for complete search history.

(56) References Cited

U.S. PATENT DOCUMENTS

| 5,987,388 A | * | 11/1999 | Crawford et al. ............. 702/16 |
| 5,999,885 A | * | 12/1999 | Van Bemmel et al. ........ 702/14 |
| 6,138,076 A | * | 10/2000 | Graf et al. .................... 702/14 |
| 6,401,042 B1 | * | 6/2002 | Van Riel et al. .............. 702/17 |
| 6,791,900 B1 | * | 9/2004 | Gillard et al. ................. 367/40 |

* cited by examiner

Primary Examiner—Donald McElheny, Jr.
(74) Attorney, Agent, or Firm—Duane Morris LLP

(57) ABSTRACT

A method of managing a repeated surface comprising seismic data as one surface is disclosed where a plurality of horizons is analyzed and a determination made as to which of the plurality of horizons comprise a repeated surface. Those horizons which comprise the repeated surface may then be logically connected into a logically connected horizons data set which may then be assigned a common identifier and which may further respond similarly to a single event, e.g. a user action. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or meaning of the claims.

14 Claims, 10 Drawing Sheets

SYSTEM AND METHOD FOR INTERPRETING REPEATED SURFACES

FIELD OF INVENTION

The present invention relates generally to the geological field of delineating more or less horizontal surfaces that repeat vertically and in particular to the field of seismic data interpretation for the purpose of finding natural occurrences of oil and gas.

BACKGROUND OF THE INVENTION

Seismic interpretation is the science and art of deducing geologic history by delineating geological surfaces a represented in and by seismic data. These surfaces represent boundaries between layers of rock in the Earth, and knowing the geometry of the layers is important for understanding the history of the rocks. Layer geometry may reveal the presence of buried river channels or beaches. If layers are tilted, bent, or broken, the geometry may reveal that rocks moved after they were buried. Seismic data provide a relatively inexpensive way to discover subsurface geometry.

Seismic data are typically produced by transmitting acoustic signals (generated by dynamite, for example) into the Earth and recording the echoes. The Earth typically consists of rocks deposited as layers, and the acoustic properties of rock typically change from layer to layer. Changes in acoustic properties cause echoes at layer boundaries, and these boundaries constitute "surfaces of reflection." Subsurface geometry can be deduced, in varying degrees, by study of these surfaces. Interpreters, e.g. users or computer programs or both, want to know the position, shape, and orientation of subsurface layers and whether they are broken or continuous.

Rocks in the subsurface are generally porous, similar to beach sand but with less ability to absorb fluids. Such rocks contain either water, oil, or gas. Oil and gas are lighter than water and float upward in the subsurface as they do at the surface. The path of movement and the cessation of movement is in large part dependent on the geometry of the subsurface layers in which the fluids move, and this makes the geometry of interest to seismic interpreters.

The geometry also allows the interpreter to deduce how the rocks came to be deposited, whether at the mouth of a delta, whether upstream as sand bars or mud in overbank flooding, or whether the rocks were deposited offshore from a delta in deeper water. This history can be important in more sophisticated analyses regarding the generation of oil and gas and the distribution of pores in the subsurface.

FIG. 1 depicts a typical seismic echo as detected by a single receiver at the surface. It is a sinusoidal curve as a function of time. The strength of the echo oscillates between compression and rarefaction over a period of several seconds, and this rise and fall in pressure with time is recorded for processing and analysis. A single recorded echo is called a "seismic trace." FIG. 2 shows the same trace enhanced for interpretation purposes. Where the signal rises above zero (into compression), the line marking the signal has been filled in with black. The configuration of a trace reflecting to the right and then returning toward zero, as highlighted in black, is called a "peak" in the trace.

To detect geometric relationships, echoes must be collected along a line or over an area, so seismic receivers are typically laid out along a line or in a grid pattern over the surface of the Earth. Capture over an area permits comparison of echoes from location to location. Each receiver, in effect, affords a "peephole" into the subsurface, and geometry is detected, e.g. viewed, from many such adjacent peepholes.

Even when collected in grids, seismic data are typically interpreted as lines, or vertical "sections" of data, each line or section being only part of a grid when data are collected in a grid pattern. A line display provides a profile view of the seismic echoes so that one can readily see differences in the chain of echoes along the line.

FIG. 3 depicts a typical seismic line as a collection of traces such as shown in FIG. 1, and FIG. 4 shows the same line as typically displayed for interpretation, using the display technique of FIG. 2.

One aspect of interpretation is the mechanical marking of surfaces deemed important by the interpreter. Marking these surfaces is done by interpreters when they draw lines on the seismic section. Each line represents the presence of an interpreted surface at that location. An interpretation project will typically generate several dozen and sometimes hundreds of surfaces. Each surface is represented by lines drawn on numerous seismic sections. Surfaces are typically called "horizons," and the surface name is the "horizon name." Each surface is typically named distinctively, in part so that the interpreter can recognize something of its importance to geological understanding.

Horizons may be displayed in color so that they can be distinguished from one another and from the seismic data itself. FIG. 5 is the same as FIG. 4 with a typical seismic interpretation added. This is a simple interpretation in which the interpreter has followed seismic peak amplitudes across parts of the section.

One geometry of interest for the present invention is the geometry of repeated surfaces. FIG. 6 is a duplicate of FIG. 5 with additional interpretation. The second interpretation has the same color as the first, and it is intended to represent the same surface but at a different depth. This type of surface is sometimes called a "repeated" or "repeating" surface. This surface in FIG. 5 is also present in two separated locations, but the locations are separated laterally. "Repeated" is reserved for multiple occurrences of a surface vertically. For example, if a well were drilled at the location indicated in FIG. 6 the same surface would be encountered twice by the well. This would be detected by a repeat of rock samples taken from the well.

Layers of rock may have been physically "pushed," e.g. from left to right. Ramp-like surfaces of slippage over which these huge pieces of rock once slid may be indicated, e.g. by using color, and may further be annotated, e.g. with small arrows indicating movement of the rock above over the rock below the surface. Such surfaces are known as "thrust faults", and the layers of rocks are known as "thrust sheets." Thrust faults, and hence repeated surfaces, are common in some hydrocarbon-bearing provinces such as western Colorado, western Canada, and western Colombia. Vendors of seismic interpretation software are well aware of the need for a means to interpret repeated surfaces in part because requests for this ability are frequent.

Representation of repeated surfaces is a challenge when surfaces are represented on a computer, as in FIG. 6. When computers are used for seismic interpretation, the interpreter "draws" the surface on the computer screen, e.g. with the mouse cursor. This is very like tracing the surface with a pencil, and the computer mimics the pencil by displaying the path of the cursor as colored lines on the seismic image, such as are shown in FIGS. 5 and 6.

To correct a horizon, the interpreter redraws the line, and the old line is automatically erased where it overlaps the existing line. FIG. 7 shows a first step that may be present when revising the interpretation shown in FIG. 6. Reinterpretation began at point A and is presently at point B.

The computer recognizes that the new line is at the same position on a map but at a different vertical position and erases the original interpretation, higher or lower, as the new interpretation is added. This convenience works very well unless the surface is a repeated surface and the new interpretation is intended to indicate repetition of a surface, not a correction to a surface.

The horizon name may be key to whether a new interpretation is added or an existing interpretation is replaced. For example, if the name is the same as an existing horizon at the given location, the new drawing may be recognized as a correction and the existing marking may be erased where it overlaps the new marking. If the name is different, the new line may not erase the existing line.

FIG. 8 illustrates the ambiguity of reinterpretation. If the two horizons are in fact the same, where such cannot be distinguished by the computer, the same procedure that generated FIG. 7 could also generate FIG. 8.

A user could instruct the computer to add new lines regardless of existing lines, but this would eliminate the convenience of automatic correction, and correction is a very common process. If old lines were not removed automatically, interpretation would be a much more time-consuming, and therefore costly, process because interpreters would have to erase as much as they reinterpret. Interpreters may be well acquainted with the difficulty of interpreting a repeating surface, but typically none propose that removing automatic erasure is a workable solution.

For purposes of presentation, interpreters can assign the same identifier, e.g. color, to all horizons that represent a given repeated surface. A reviewer of the data will then see them as the same surface repeated. Internally, the horizons have different names so they can overlap without the implied erasure problem. The interpreter may assign similar names so that horizons can be recognized as related in a list. "Eocene 1" might represent one component of the "Eocene" surface while "Eocene 2" represented another component.

Vendors of software for seismic interpretation often receive a request for improving the handling of repeated surfaces. One focus in this effort has been to find a way to draw a line using an existing name while appropriately erasing or not erasing other lines with the same name. A key to interpreting a repeated surface is development of a method that allows users, e.g. interpreters, to manage, not draw, a repeated surface as one surface. Most of the effort toward solving the "repeated surface problem" has been focused on how interpreters mark the surface on the computer screen, but this is a small part of the problem. If the problem were solved in the marking methodology, then the parts would have a common genesis that would facilitate common management, but a common genesis is not essential to meeting the need for repeated surfaces, whereas common management is essential.

Repeated surfaces are typically created and manipulated as single surfaces. The result is that some operations with repeated surfaces are either not possible or are very inconvenient.

SUMMARY OF THE INVENTION

Logically connecting a set of horizons which represent the same surface in seismic data into a single, manipulable data structure aids in seismic data interpretation and management of the repeated surfaces. Horizons which comprise a repeated surface may be logically combined so that they respond as a group to user commands.

A repeated surface may be created using a computer by interpreting each overlapping component of a plurality of overlapping components as a separate, single, surface; storing the surfaces in a computer memory; logically connecting the surfaces; and managing the combination as a single entity. Each component may be interpreted by replacing a previous interpretation with a new interpretation that overlaps an existing interpretation, creating a new interpretation, or the like.

Horizons comprising a given repeated surface may be logically connected into a logically connected horizons data set, e.g. manually by a user or by other means, e.g. programmatically such as by use of object oriented programming constructs or the like. Different methods may be employed or combined to be most effective in a given computer environment.

An interpretation process involving seismic data may extend beyond marking lines on seismic sections or in seismic volumes. It may additionally require one or more operations on or with the aid of horizons. Logically connected horizons that respond with a common response to a single event, e.g. a user action, will facilitate interpretation.

It is emphasized that the scope of the invention is not limited by this summary but instead is limited by the claims.

DETAILED DESCRIPTION OF THE PREFERRED EMBODIMENT

As used herein, "data" comprises the singular and the plural. Further, "computer display" comprises computer generated output whether output to a computer screen, a computer file, a printer, or the like, or a combination thereof.

Figure 9:
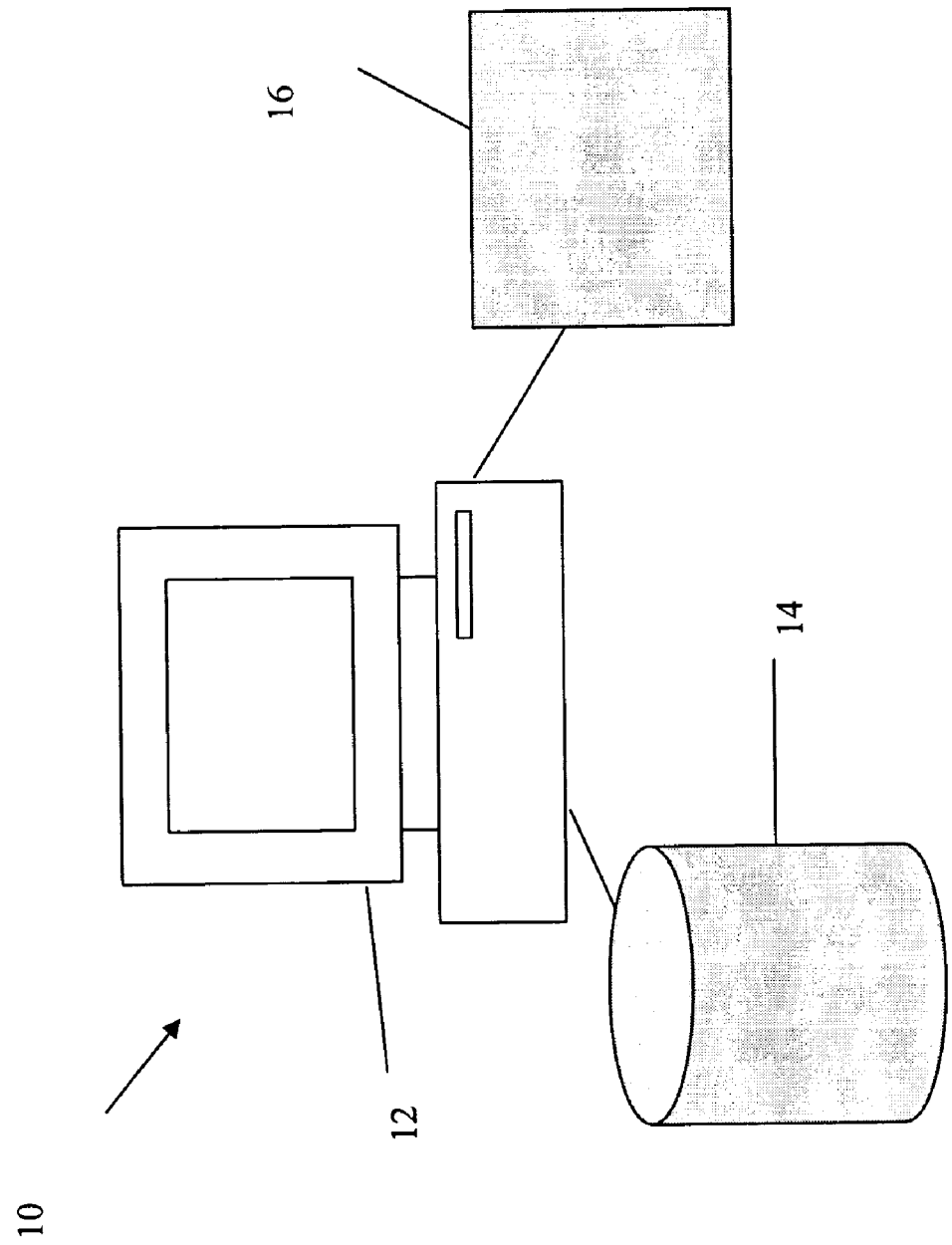
FIG. 9 is a schematic of a representative computer system for use with the present invention.

Referring now to FIG. 9, system 10 may be used for managing a repeated surface comprising seismic data as one surface. System 10 may comprise computer 12 comprising a plurality of data structures accessible to computer 12, e.g. stored in a computer memory such as persistent data store 14 or transient memory such as random access memory. Each data structure may be adapted to contain seismic data. Seismic data input device 16, operatively connected to computer, may be used to give computer 12 access to an initial set of seismic data, e.g. through batch processing and/or interactive inputs.

Seismic data set computer program 20 (not shown in the figures) is resident in computer 12 and is adapted to relate a plurality the data structures containing seismic data representative of horizons which comprise a repeated surface to form a logically connected horizons data set capable of responding to a single function operating on the logically connected horizons data set with a common response.

Figure 10:
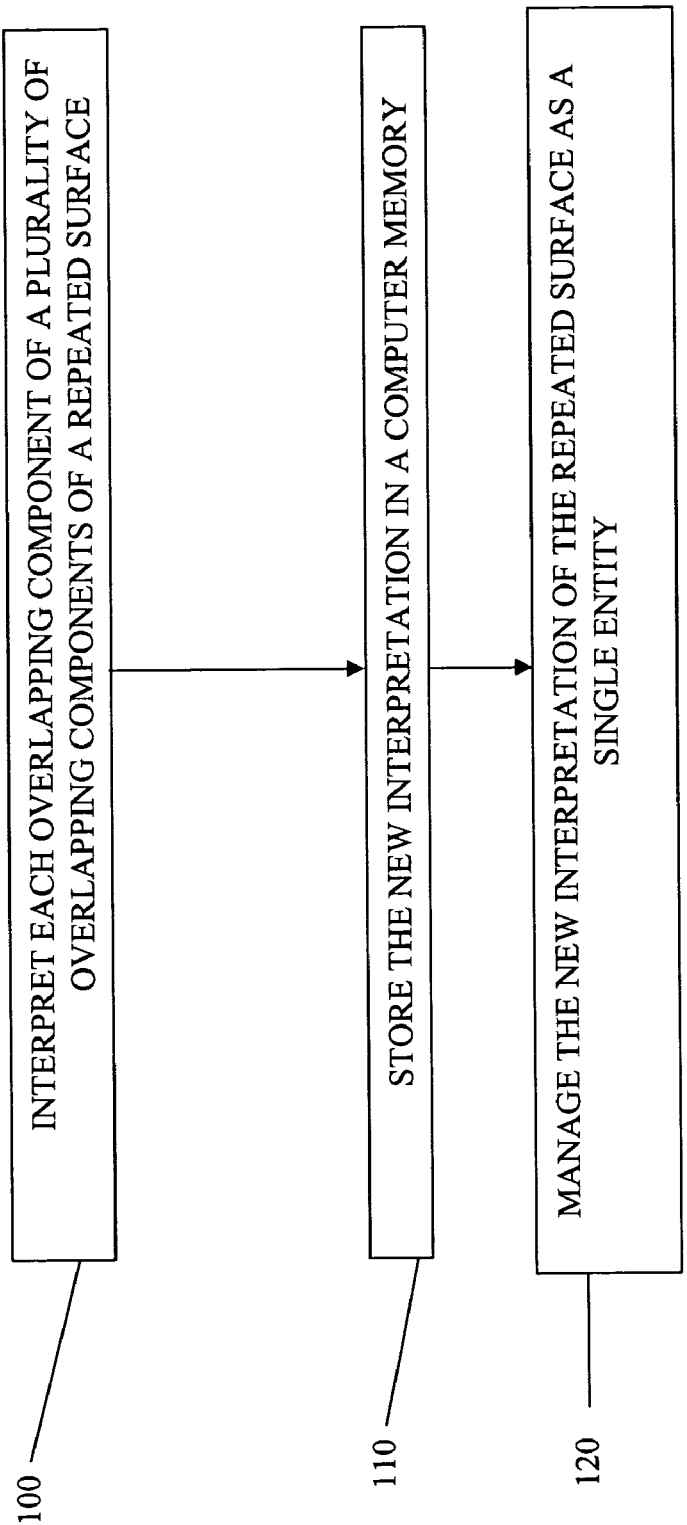
FIG. 10 is a flowchart of a method of the present invention.

In the operation of exemplary embodiments, referring to FIG. 10, for interpretation of seismic data, surface management typically consists of applying operations to surfaces, e.g. on a computer display, including operations such as hide, show, delete, rename, and the like, or combinations thereof. Surface management of repeated surfaces typically requires that operations be carried out on all components of the repeated surface in a manner consistent with the nature of the surface. Accordingly, the following describe some operations which may be applied to a logically connected horizons data set by a single event, e.g. a user initiated event.

Several alternative embodiments may employ logically connected horizons. In these embodiments, operations on repeated surfaces, e.g. logically connected horizons, may be performed on all connected horizons by referring to the logically connected horizons by a collection name rather than the horizon name.

In a first embodiment, a designated or marked segment of a horizon name could be reserved for repeated surfaces. For example, if a first portion of the horizon name, e.g. the first character, is a special symbol, e.g. an ampersand ("&"), a second portion, e.g. the next three characters, may be used to identify the repeated surface of which the horizon is part. As used herein, a special "symbol" may be a character. For example, "&A01B5_501_Marker" and "&A01B6_500_Lower" may be part of the repeated surface identified by A01. Alternatively, a special symbol or character could indicate that the last two characters in the name identify the repeated surface. There are many, many possible coding schemes. This approach may comprise a formal codification of using similar names, a codification that would be recognized by the computer software as well as by the interpreter.

In a second embodiment, a special keyboard key or key combination may be used by a user at a computer during a seismic data interpretation process. As used herein, "special keyboard key" is equivalent to a single key or a combination of keys. For personal computers, the Alternate Key and the Control Key are the most commonly used keys for changing the meaning of an operation. Therefore, by way of example and not limitation, a user/interpreter using a personal computer may first identify an existing surface to be interpreted. The intepreter might use a pointing device, e.g. a mouse or a light pen, to click on a portion of a computer display which displays a representation of the surface, choose a surface from a list of surfaces, or the like, or a combination thereof. If interpreter then proceeds to interpret without holding down a keyboard key, e.g. the Control Key, this new interpretation may replace an old interpretation where they overlap. However, if the keyboard key is depressed when the new interpretation begins, the computer may then generate a new version of the horizon, e.g. by adding some character code to the name as described above, and the new horizon will not replace the old where they overlap.

In a third embodiment, a user/interpreter may be given the ability to create a named collection of horizons. Horizons may then be assigned to and/or removed from a named collection as desired, e.g. by graphically dragging the name to a collection. In an embodiment, text may be entered into a data structure, e.g. a table. The text may further be associate with a surface name. In a preferred embodiment, the text comprises a name of the collection and the text being associated with a surface name.

In a fourth embodiment, surfaces may be given two references: a distinct "horizon name" such as occurs in current practice and a "label," e.g. a collective identifier. Using distinct horizon names insures that replacement of existing interpretations is correct. A user may then use the horizon name for one set of purposes, e.g. drawing, and label for other purposes, e.g. collective operations on the logically connected horizons as a whole. Similar to the third embodiment, the label may be used as the "name" of logically connected horizons when displayed on a seismic section or on a map such as on a computer display.

In a fifth embodiment, a user initiated action may result in a set of actions involving the logically connected horizons. For example, a user may right-click a mouse over a horizon displayed on a computer display. The user may then be presented with the name of that horizon and the names other horizons that are designated part of the same repeated surface, i.e. part of the logically connected horizons. Additionally, the user may be presented with one or more options, e.g. to create a new name as part of the same surface or to make the surface part of a new or existing collective of logically connected horizons.

As used herein, managing an interpretation of a repeated surface as a single entity may include deleting surfaces as a group, exporting surfaces as a group, labeling surface as a group in displays, fitting mathematical surfaces to interpreted surfaces as a group, contouring interpreted surfaces and resulting mathematical surfaces as a group, display of surfaces in a map view as a group, converting surfaces in time to surfaces in depth as a group, converting surfaces in depth to surfaces in time as a group, changing label characteristics such as fonts, changing the color used to display surfaces, turning on and off display of surfaces as a group, shifting a set of surfaces in time or depth by a constant amount, shifting a set of surfaces in time or depth to attach to a feature of the seismic data such as a peak or trough, or the like, or a combination thereof. Fitting mathematical surfaces to interpreted surfaces as a group may further comprise managing the resulting mathematical surfaces as a group.

A repeated surface may be interpreted using a computer by interpreting each overlapping component of a plurality of overlapping components of a repeated surface, step 100. Interpretation may comprise replacing a previous interpretation with a new interpretation that overlaps an existing interpretation, creating a new interpretation, or the like. Once created, the new interpretation may be stored in a computer memory, step 110, e.g as part of a dataset or database or the like. As used herein, "computer memory" comprises transient and permanent data stores, e.g. electronic memory, magnetic memory, optical memory, and the like. Once stored, the new interpretation of the repeated surface may be managed as a single entity.

A user may be allowed to show, hide, or toggle the display of a horizon on a seismic section displayed on a computer or a logically connected horizons data set. With hundreds of horizons, such a section can become impossible to see if all horizons are visible. Accordingly, a user may be allowed to control the visibility of all parts of a repeated surface. For example, rather than controlling visibility for each horizon identified with a repeated surface, the user can control all parts of the logically connected horizons data set at once. This reduces the labor in addressing the visibility of each horizon and reduces the likelihood of overlooking horizons in a repeated surfaces. In an embodiment, management of the plurality of components may comprise assigning a name to the plurality of components. The name may comprise a unique, predetermined pattern of alphanumeric characters for the name. For example, as noted above, "&A01B5_501_Marker" and "&A01B6_500_Lower" may be part of the repeated surface identified by A01. The repeated surface may then be managed at least in part on the basis of the content of its assigned names.

A user may be allowed to change a display attribute of a horizon or a logically connected horizons data set. For example, the display attribute may comprise a color, font, size, line characteristic, or the like, or a combination thereof. A user can, for example, change the display attribute of a label display. The horizon or logically connected horizons data set can be made distinct from surrounding horizons or so that it will stand out in a presentation. Thus, with components linked such as in a logically connected horizons data set, a user can set the display attribute of all components in a logically connected horizons data set by setting the display attribute of the logically connected horizons data set.

As used herein, a line characteristic may comprise a line style of a horizon. With dozens of horizons in a display, a user may run out of distinguishable colors, and thickening or thinning a line or changing it from solid to dashed, dotted, or double-lined can be helpful. As with other display attributes, a user can set the line style of all components in a logically connected horizons data set by setting the line style of the logically connected horizons data set.

A user may be allowed to convert a horizon or a logically connected horizons data set from time to depth. As will be understood by those of ordinary skill in the seismic arts, seismic sections are collected by recording events in time. A user/interpreter may therefore capture horizon locations in time, i.e. at a given point on the surface a given horizon is identified as being so many seconds below the surface. However, wells are drilled and volumes of reservoirs are calculated based on depth, so it is often desirable to convert horizon locations in time to locations in depth. In it simplest form, conversion to depth is facilitated by a table of time versus depth. Time values are referred to the table for their equivalent depths, and the points on the surface are assigned to these depths.

A user may set data for a horizon or for all components in a logically connected horizons data set to either time or depth. With the components linked, one can cause each component of the logically connected horizons data set to be converted to depth by converting the collection to depth. Methods for converting a single surface are well known. By converting the collection to either time or depth it is understood that each component is converted as if it were a single surface.

A repeated surface may be displayed on a map, e.g. superimposed on a map displayed on a computer display. Horizons may be identified and marked on vertical sections, but they are commonly displayed on maps, e.g. on a computer display. The display is typically colored to represent the time of the interpretation at that location. Coloration by time value provides an understanding of the geometry of the surface. Gaps in the display show where interpretation has yet to be done.

A user may convert a horizon or all components in a logically connected horizons data set to either time or depth. With the components linked, one can cause each component of the logically connected horizons data set to be converted to time or depth by converting the collection to time or depth. Methods for converting a single surface are well known. By converting the collection it is understood that each component is converted as if it were a single surface.

Typically, only one horizon is displayed on a given map because horizons usually overlap over large areas. A lower horizon may be covered by a higher horizon, and gaps in higher horizons would reveal lower horizons. The visibility of lower horizons in the gaps is confusing because one cannot know which horizon is showing through. Hence, all such maps typically show only one surface.

Figure 1:
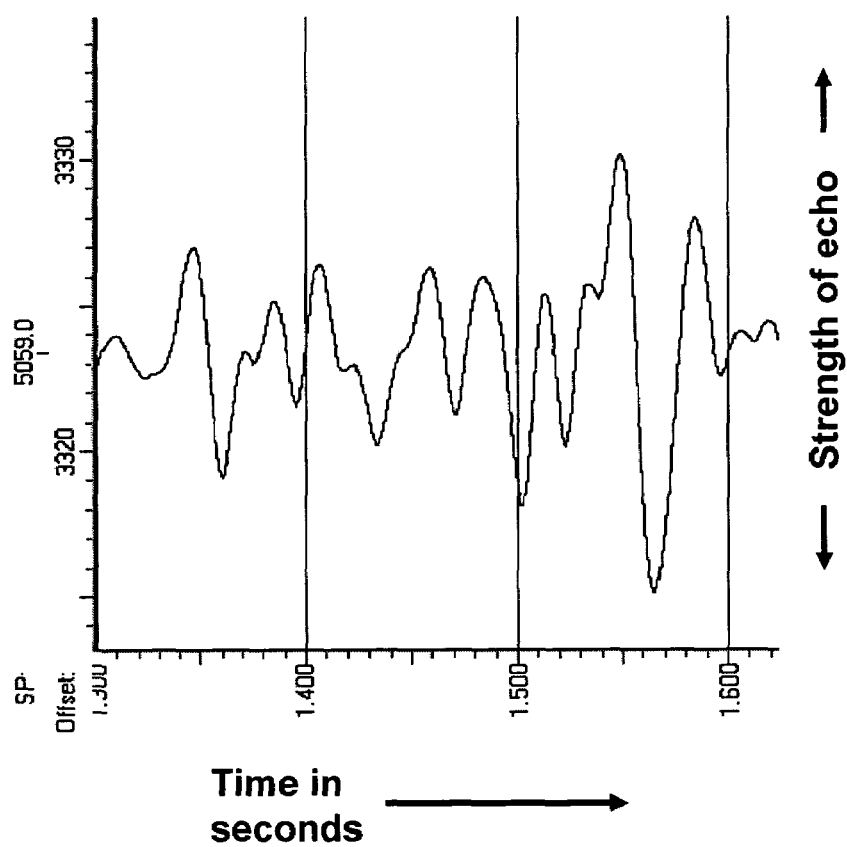
FIG. 1 depicts a typical seismic echo as detected by a single receiver at the surface, e.g. a typical seismic echo showing strength of echo (loudness) recorded as a function of time.
Figure 2:
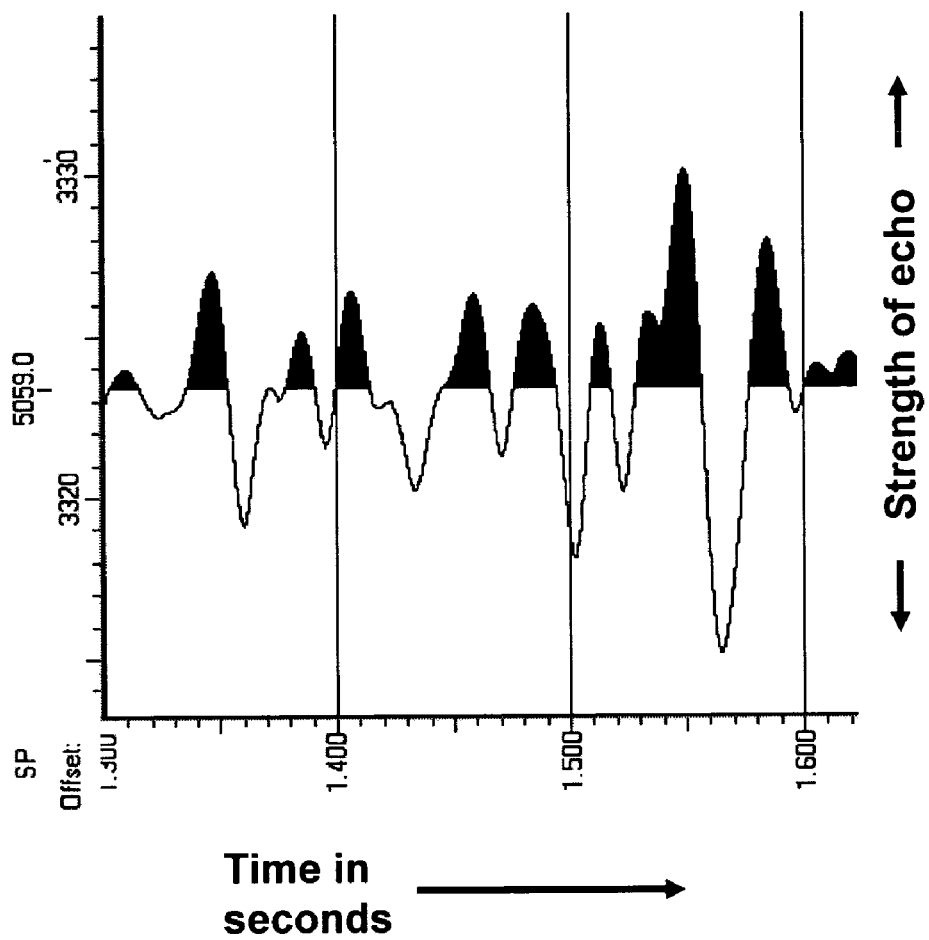
FIG. 2 shows the same trace enhanced for interpretation purposes, i.e. positive (compressional) phase of echo highlighted in black.
Figure 3:
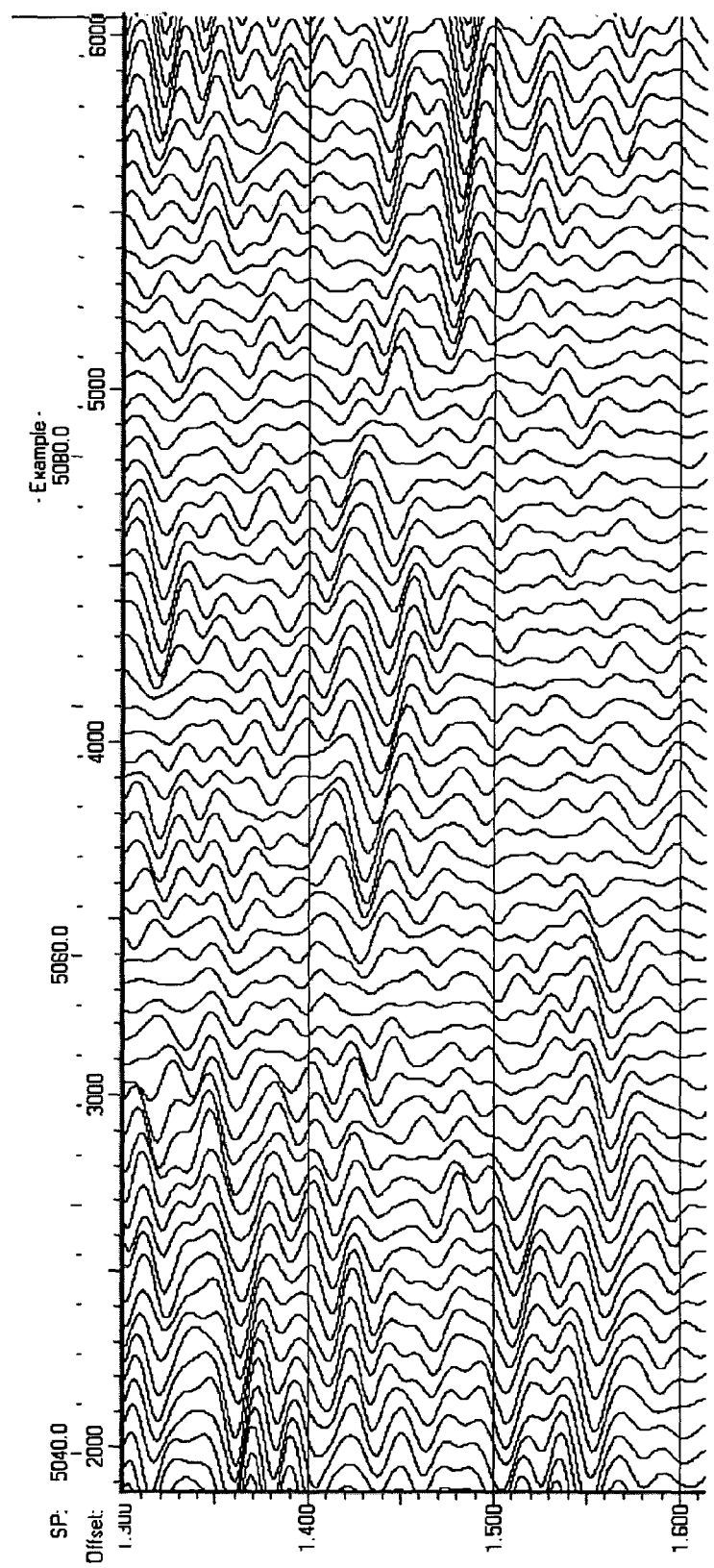
FIG. 3 depicts a typical seismic line as a collection of traces such as shown in FIG. 1.
Figure 4:
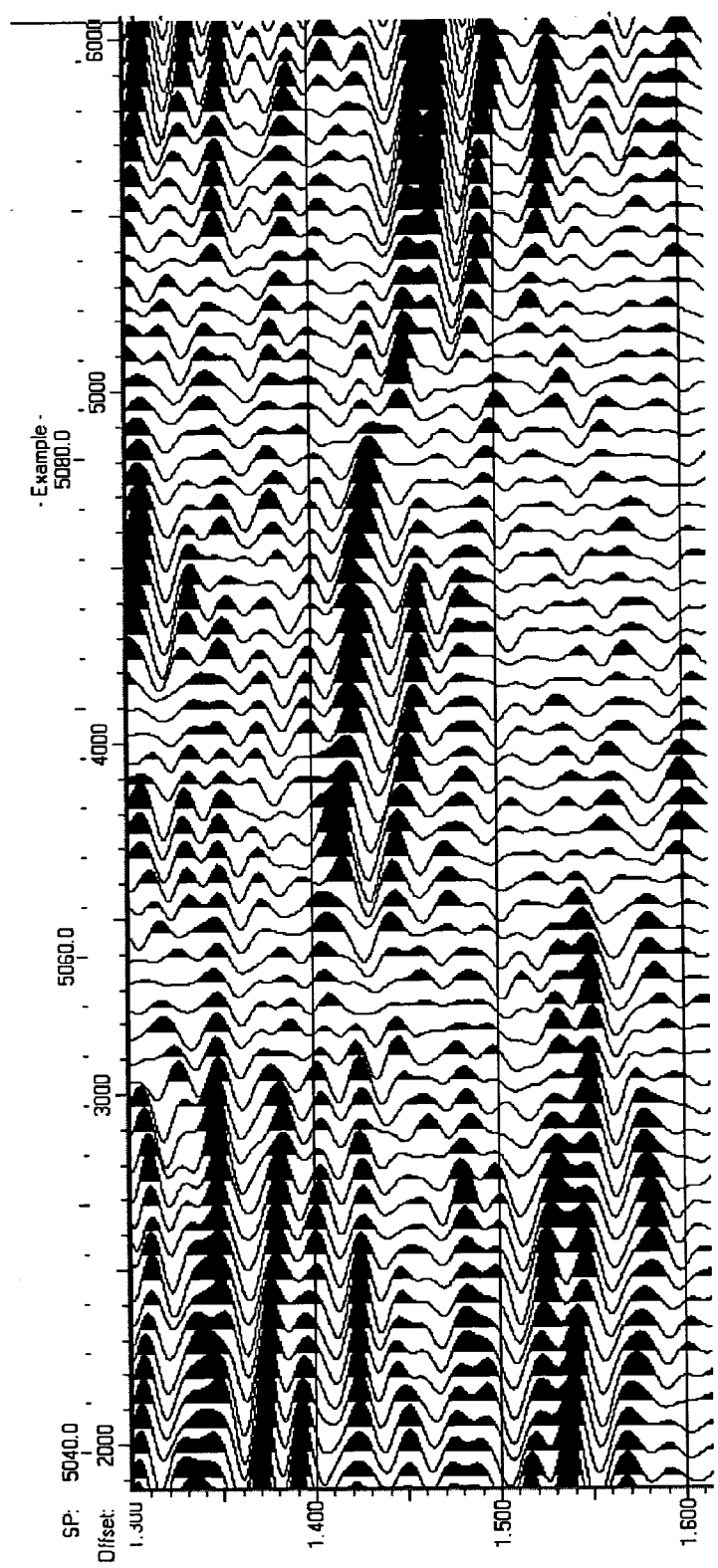
FIG. 4 shows the same line as in FIG. 3 as typically displayed for interpretation, using the display technique of FIG. 2, i.e. positive (compressional) phase of echo highlighted in black.
Figure 5:
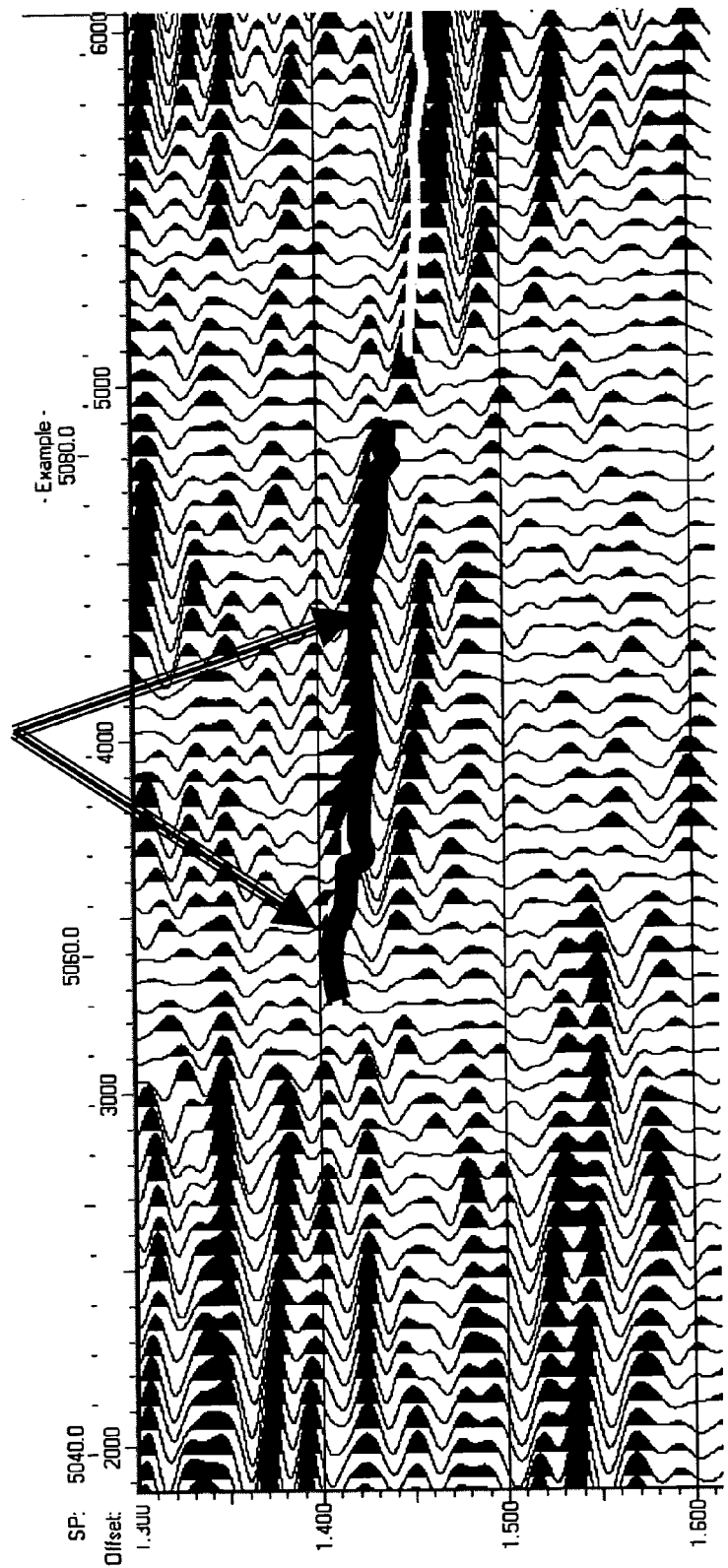
FIG. 5 is FIG. 4 with a typical seismic interpretation added, illustrated as a patterned line.
Figure 6:
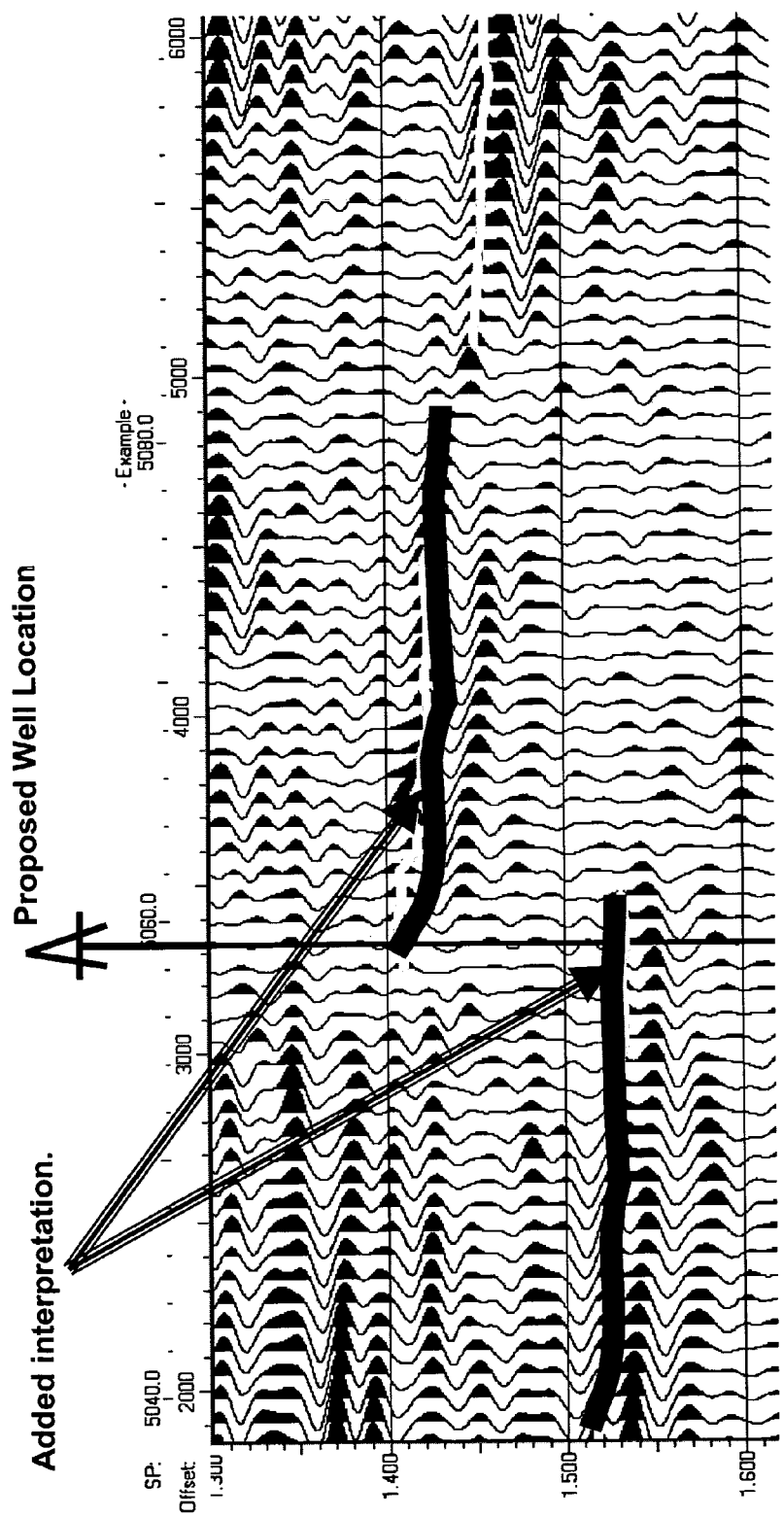
FIG. 6 adds an interpretation to FIG. 5, illustrated as a patterned line.
Figure 7:
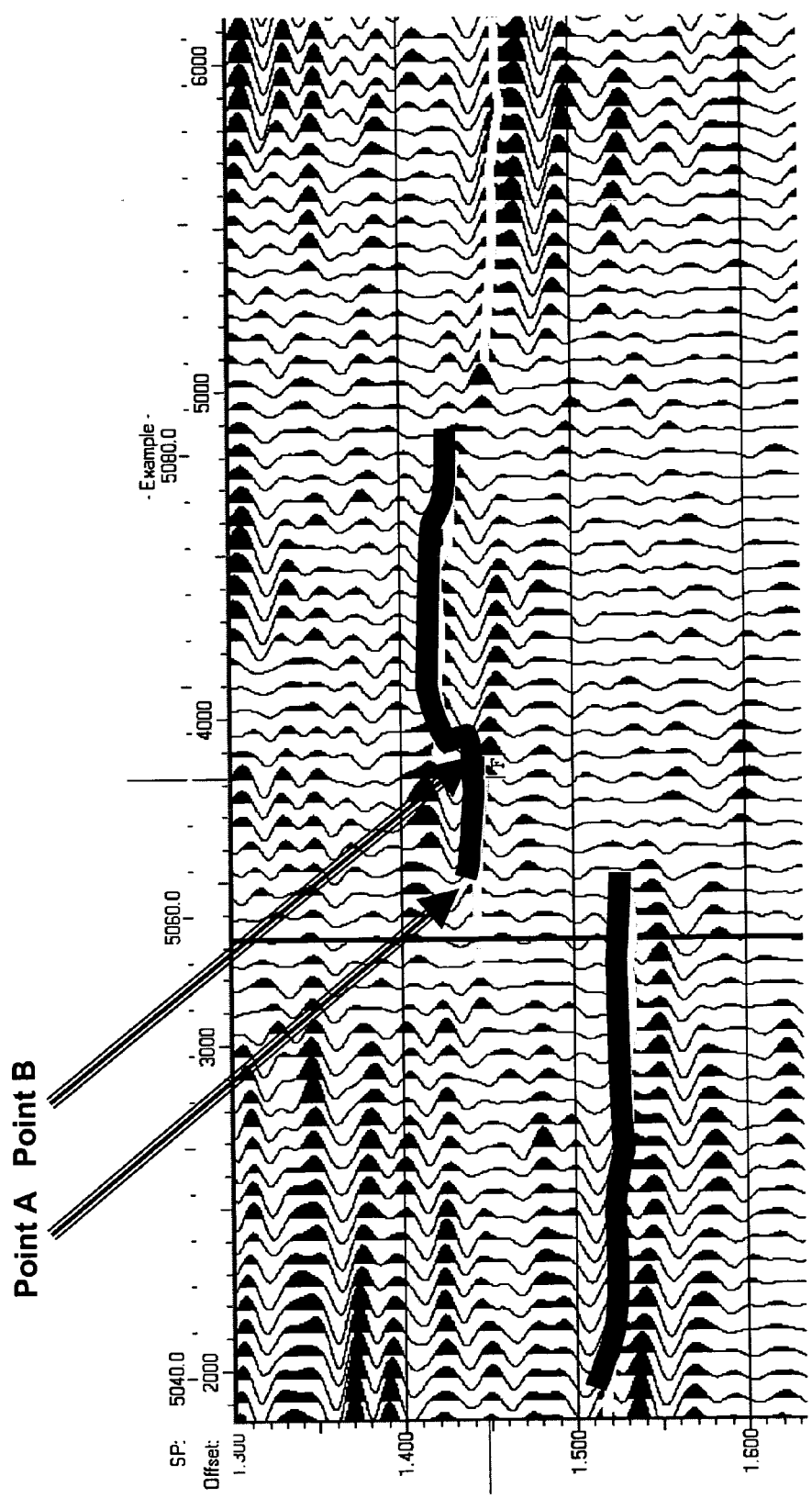
FIG. 7 shows a first step that may be present when revising the interpretation shown in FIG. 6.
Figure 8:
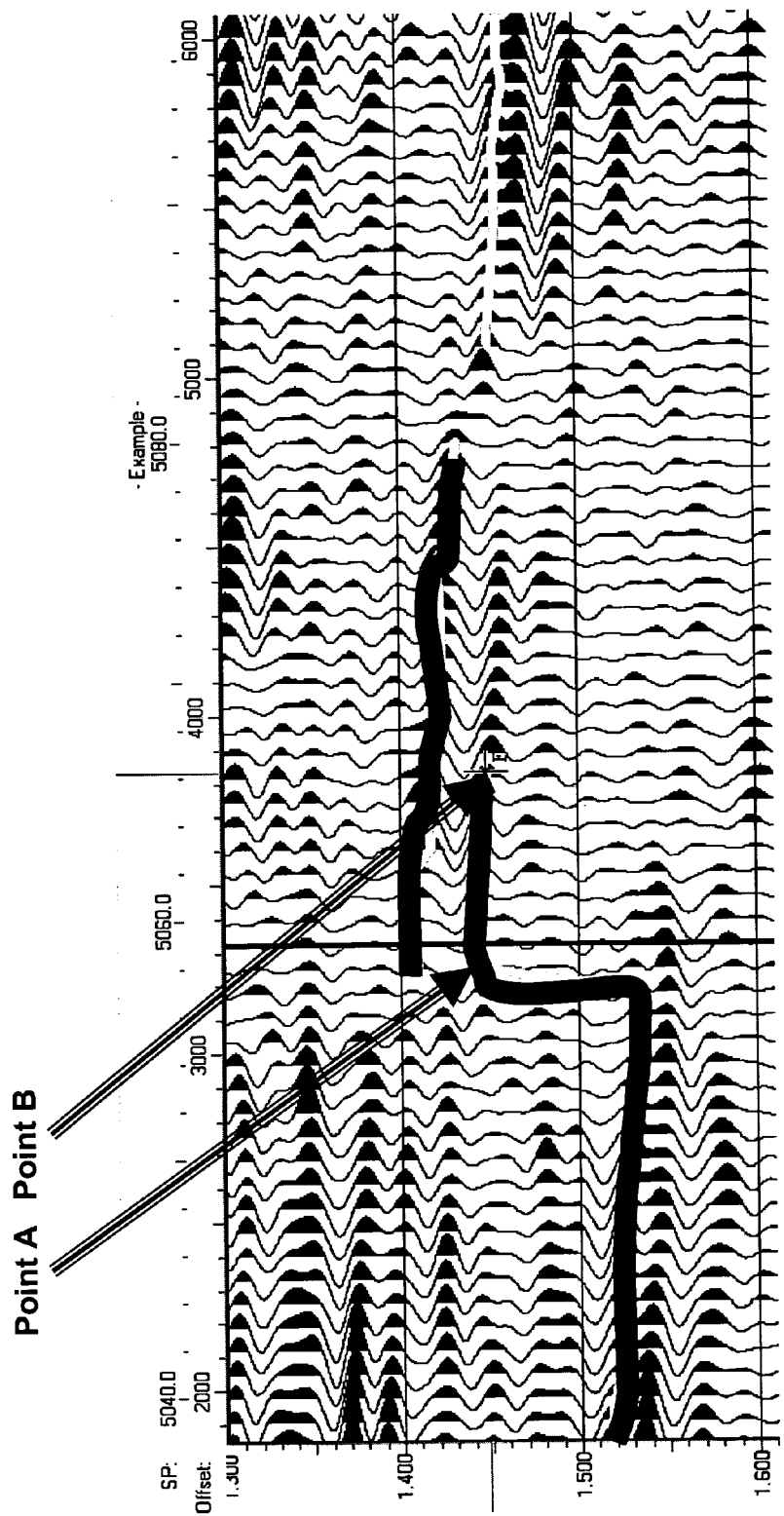
FIG. 8 illustrates the ambiguity of reinterpretation.

In the case represented by FIG. 6, display of just the upper horizon would show where it terminated. Display of both horizons, colored according to time value, would show any relationship between the location of this edge with geometric variation in the lower surface. The lower horizon, for example, might dip or it might rise where the upper edge retreats or advances.

Contouring is a common way to quantitatively display horizon geometry. These contours are the same kind of contours that are drawn on topographic maps. Each contour line has the same time or elevation. Domes and dimples are typically identified by concentric circular contour lines, and ridges and troughs are typically identified by concentric lines that enclose an elongate shape rather than a circular shape.

A horizon or a logically connected horizons data set may be contoured. A user may be allowed to cause each component to be contoured by submitting the collection for contouring. Each component may further be contoured independent of the others.

Mathematical surfaces may be fitted to a horizon or all horizons in a logically connected horizons data set. Each component of a logically connected horizons data set may be gridded independently of the others. A mathematical surface may smooth out vagaries in the interpretation and may be better adapted than the original horizon for manipulation by computer programs. Such surface fitting typically goes by the designation "gridding" in the industry because a grid pattern of numbers is the usual result of the process.

Gridding highlights the difficulty in dealing with repeated surfaces because a grid has only one value at a given location and repeated surfaces have two or more values in some locations. Which value should the grid recognize? This is the classic dilemma of repeated surfaces for surface operations. By treating the repeated surface as a collection of individual surfaces, each surface is seen to be gridded separate from the others, and the result is a collection of grids rather than a single grid.

Labels may be important for communication. All parts of a repeated surface may be required to display the same name even though the automatic erasure function requires that they be named differently. Accordingly, each horizon may be labeled, a logically connected horizons data set may share a single label, or a combination thereof.

Horizons may be exported for use elsewhere, e.g. for use by a computer program not used for seismic data interpretation. Writing interpretations to computer files in a format that allows them to be transferred to other projects is a very important and commonly employed operation. With horizons linked into a logically connected horizons data set, a user may write all horizons to the same file or to separate files without having to perform the operation one horizon at a time. Use of the logically connected horizons data set may be help ensure that all components are included in the file or files.

When an interpretation is to be deleted, all components should be deleted. A repeated surface may have components that are overlooked in the deletion process. Accordingly, use of a logically connected horizons data set may help ensure that all components associated with a repeated surface are deleted when desired by the user.

A user may shift a horizon or all components in a logically connected horizons data set by a constant amount or to attach to a feature of the seismic data such as a peak or trough. Because seismic features such as peaks and troughs are not separated by constant amounts, the amount shift will vary along a horizon and between horizons in the same logically connected data set.

It will be understood that various changes in the details, materials, and arrangements of the parts which have been described and illustrated above in order to explain the nature of this invention may be made by those skilled in the art without departing from the principle and scope of the invention as recited in the appended claims.

We claim:

1. A method of interpreting a repeated surface using a computer, comprising:
   a. interpreting each overlapping component of a plurality of overlapping components of a repeated surface;
   b. logically associating each overlapping component with the interpretation;
   c. storing the interpretation in a computer memory; and
   d. managing the interpretation of the repeated surface as a single entity.

2. The method of claim 1, wherein interpreting each overlapping component further comprises at least one of (i) replacing a previous interpretation with a new interpretation that overlaps an existing interpretation or (ii) creating a new interpretation.

3. The method of claim 1 wherein managing the plurality of components further comprises:
   a. assigning a horizon name to the plurality of components, the horizon name comprising a predetermined pattern of alphanumeric characters for the horizon name; and
   b. managing a repeated surface on the basis of the content of its assigned horizon name.

4. The method of claim 3, wherein:
   a. commonality of a portion of the predetermined pattern of the horizon name may be used to identify a normal surface as part of a single repeated surface.

5. The method of claim 1, further comprising:
   a. using a pointing device to aid with an interpretation task;
   b. identifying a component as part of an existing repeated surface by depressing a predetermined key on a computer keyboard while using the pointing device;
   c. generating a normally interpreted surface by interpreting an identified first existing repeated surface without depressing the predetermined key; and
   d. identifying the identified first existing repeated surface as a component of an existing repeated surface by depressing the predetermined key while interpreting a second desired surface.

6. The method of claim 5 further comprising:
   a. identifying the first existing repeated surface by using the pointing device and clicking on the first existing repeated surface.

7. The method of claim 5 further comprising:
   a. selecting the existing repeated surface from a list of existing repeated surfaces.

8. The method of claim 5, wherein:
   a. the existing repeated surface identified is the repeated surface last interpreted when the predetermined key was not depressed.

9. The method of claim 1, further comprising:
   a. assigning a repeated surface to a collection, comprising:
      i. interpreting a plurality of surfaces by providing each of the plurality of surfaces with a name adapted to be recognized by a computer, the name further being distinct from all other names for surfaces currently stored in the computer memory; and
      ii. replacing each previous interpretation with a surface where such interpretation is overlapped by a surface with the same name.

10. The method of claim 9 wherein assignment to a collection comprises:
    a. entering text into a data structure; and
    b. associating the text with a surface name;
    c. wherein the text comprises a name of the collection and the text being associated with a surface name.

11. The method of claim 9 wherein:
    a. assignment is accomplished by graphically dragging the name to a collection.

12. The method of claim 1, wherein managing the new interpretation of the repeated surface as a single entity comprises at least one of (i) deleting surfaces as a group, (ii) exporting surfaces as a group, (iii) labeling surfaces as a group in displays, (iv) fitting mathematical surfaces to interpreted surfaces as a group, (v) contouring interpreted surfaces and resulting mathematical surfaces as a group, (vi) display of surfaces in map view as a group, (vii) converting surfaces in time to surfaces in depth, (viii) converting surfaces in depth to surfaces in time, (ix) changing label characteristics such as fonts, (x) changing the color used to display surfaces, (xi) turning on and off display of surfaces as a group, (xii) shifting a set of surfaces in time or depth by a constant amount, or (xiii) shifting a set of surfaces in time or depth to attach to a feature of the seismic data such as a peak or trough.

13. The method of claim 12, wherein fitting mathematical surfaces to interpreted surfaces as a group further comprises managing the resulting mathematical surfaces as a group.

14. A system for managing a repeated surface comprising seismic data as one surface, comprising:
    a. a computer comprising a plurality of data structures accessible to the computer, each data structure adapted to contain seismic data;
    b. a seismic data input device operatively connected to the computer; and
    a. a seismic data set computer program resident in the computer, adapted to relate a plurality the data structures containing seismic data representative of horizons which comprise a repeated surface to form a logically connected horizons data set capable of responding to a single function operating on the logically connected horizons data set with a common response.

* * * * *